United States Patent
Yokota et al.

(10) Patent No.: US 11,577,990 B2
(45) Date of Patent: Feb. 14, 2023

(54) GLASS FIBER AND METHOD FOR PRODUCING SAME

(71) Applicant: Nippon Electric Glass Co., Ltd., Shiga (JP)

(72) Inventors: Yuki Yokota, Shiga (JP); Hiroshi Sawasato, Shiga (JP); Minoru Matsumoto, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 291 days.

(21) Appl. No.: 16/768,324

(22) PCT Filed: Nov. 21, 2018

(86) PCT No.: PCT/JP2018/043014
§ 371 (c)(1),
(2) Date: May 29, 2020

(87) PCT Pub. No.: WO2019/111713
PCT Pub. Date: Jun. 13, 2019

(65) Prior Publication Data
US 2021/0179485 A1    Jun. 17, 2021

(30) Foreign Application Priority Data

Dec. 5, 2017  (JP) .............................. JP2017-233113

(51) Int. Cl.
| | | |
|---|---|---|
| C03C 13/00 | (2006.01) | |
| C03C 3/078 | (2006.01) | |
| C03C 3/085 | (2006.01) | |
| C03C 3/087 | (2006.01) | |
| C03C 4/20 | (2006.01) | |
| C03B 37/04 | (2006.01) | |

(52) U.S. Cl.
CPC ............ *C03C 13/002* (2013.01); *C03C 3/078* (2013.01); *C03C 3/085* (2013.01); *C03C 3/087* (2013.01); *C03C 4/20* (2013.01); *C03B 37/04* (2013.01); *C03C 2204/00* (2013.01); *C03C 2213/00* (2013.01)

(58) Field of Classification Search
CPC ......... C03C 3/078; C03C 3/083; C03C 3/085; C03C 3/087; C03C 13/002; C03C 13/00; C03C 13/06
See application file for complete search history.

(56) References Cited

U.S. PATENT DOCUMENTS

| | | | | |
|---|---|---|---|---|
| 3,861,926 A | | 1/1975 | Irlam et al. | |
| 3,969,121 A | * | 7/1976 | Atkinson | C03C 13/002 501/59 |
| 4,330,628 A | * | 5/1982 | Cockram | E04C 5/07 501/59 |
| 4,345,037 A | * | 8/1982 | Fyles | C04B 14/42 501/71 |
| 2015/0266769 A1 | * | 9/2015 | Nishida | C03C 3/076 65/475 |

FOREIGN PATENT DOCUMENTS

| | | | | |
|---|---|---|---|---|
| JP | 49-40126 | | 10/1974 | |
| JP | 49-113805 | | 10/1974 | |
| JP | 58-167444 | | 10/1983 | |
| JP | 58167444 A | * | 10/1983 | ........... C03C 13/002 |
| JP | 6-157072 | | 6/1994 | |
| JP | 2002-60503 | | 2/2002 | |
| JP | 2014-101270 | | 6/2014 | |
| JP | 2018-104237 | | 7/2018 | |
| JP | 2018104237 A | * | 7/2018 | ........... C03C 13/002 |
| WO | 2014/065321 | | 5/2014 | |
| WO | 2016/093212 | | 6/2016 | |

OTHER PUBLICATIONS

International Search Report dated Feb. 5, 2019 in International (PCT) Application No. PCT/JP2018/043014.
Office Action dated Mar. 11, 2022 in corresponding Chinese Patent Application No. 201880078513.0, with English-language translation of the search report.
International Preliminary Report on Patentability and Written Opinion of the International Searching Authority dated Jun. 9, 2020 in International (PCT) Application No. PCT/JP2018/043014.

* cited by examiner

*Primary Examiner* — Elizabeth A. Bolden
(74) *Attorney, Agent, or Firm* — Wenderoth, Lind & Ponack, L.L.P.

(57) ABSTRACT

Provided is a glass fiber having a low spinning temperature and a low liquidus temperature, and besides, having a large difference between the liquidus temperature and the spinning temperature, and a method of manufacturing the same. The glass fiber of the present invention includes as a glass composition, in terms of mass % on an oxide basis, 50% to 65% of $SiO_2$, 0% to 3% of $Al_2O_3$, 0% to 1% of MgO, 0% to less than 0.7% of CaO, 0% to 1% of $Li_2O$, 10% to 20% of $Na_2O$, 0% to 2% of $K_2O$, 6% to 10% of $TiO_2$, and 15% to 20% of $ZrO_2$, and has a value for $(Na_2O+K_2O)/(MgO+CaO)$ of 6.0 or more.

20 Claims, No Drawings

GLASS FIBER AND METHOD FOR PRODUCING SAME

TECHNICAL FIELD

The present invention relates to a glass fiber excellent in corrosion resistance, and more particularly, to a glass fiber that is suitable as a reinforcing material for a calcium silicate board, glass fiber reinforced concrete (GRC), or the like, or as a material required to have corrosion resistance, such as a battery separator or an alternative to asbestos, and that is excellent in productivity, and a method of manufacturing the same.

BACKGROUND ART $SiO_2$—$ZrO_2$—$R_2O$ (R represents Li, Na, or K)-based $ZrO_2$-containing alkali-resistant glass fibers have hitherto been used as a reinforcing material for GRC. The glass fibers have also been used as a reinforcing material for a calcium silicate board or as a corrosion resistant material, such as a battery separator.

GRC is obtained, for example, by spraying a mixture of glass fibers cut into a predetermined length, cement, aggregate, an admixture, water, and the like onto a formwork with a spray gun or the like to form the mixture into a plate shape, and is used as an architectural construction material. The glass fibers to be used in GRC are required to be capable of maintaining reliable strength even after a lapse of a long time in the concrete.

The above-mentioned glass fibers are obtained, for example, by continuously forming and spinning molten glass into a fiber form with a bushing device made of a noble metal. A bushing has such structure that the bushing has a container shape in order to allow residence of the molten glass, and a plurality of nozzles are arranged in a vertical direction to a bottom of the bushing. Moreover, the glass fibers are formed by drawing the molten glass adjusted to a temperature around a spinning temperature (a temperature at which the glass has a viscosity of about $10^3$ dPa·s, also called a forming temperature) into a fiber form from the nozzles at the bottom of the bushing.

Incidentally, from the viewpoint of improving the alkali resistance of the glass fibers, it is effective that $ZrO_2$ is included in a large amount in a glass composition as described in Patent Literature 1. However, in this case, the spinning temperature of the glass is increased. When the spinning temperature of the glass is increased, the bushing device made of a noble metal is severely damaged, and exchange frequency thereof is increased, which results in an increase in production cost. In addition, the liquidus temperature of the glass is increased, and a difference between the spinning temperature and the liquidus temperature is reduced. When the difference between the spinning temperature and the liquidus temperature is reduced, the glass is liable to be devitrified in the nozzles at the bottom of the bushing, which leads to a problem in that it becomes difficult to continuously produce the glass fibers.

In view of the foregoing, in recent years, for the purpose of improving the productivity of the glass fibers of this kind, various glass compositions have been proposed.

For example, in Patent Literature 2, there is disclosed a glass fiber in which the content of $ZrO_2$ is reduced and certain amounts of $TiO_2$ and $K_2O$ are incorporated, to thereby reduce a spinning temperature while maintaining a difference between a liquidus temperature and the spinning temperature. However, the difference between the liquidus temperature and the spinning temperature is small, and hence there is a problem in that, in the case of continuously producing the glass fiber in a glass melting kiln, devitrification cannot be suppressed when a glass composition somewhat varies.

In addition, in Patent Literature 3, which has been made in view of the above-mentioned circumstances, there is proposed a glass fiber in which a difference between a spinning temperature and a liquidus temperature of glass is increased, and thus a devitrification property is less liable to change even when a glass composition varies. However, the glass fiber described in Patent Literature 3 has a high liquidus temperature, and hence is liable to be devitrified at the bottom of the bushing, or as well, in a low-temperature region of a melting furnace or a forehearth. As a result, it is difficult to continuously produce the glass fiber.

CITATION LIST

Patent Literature 1: JP 49-40126 B1
Patent Literature 2: WO 2014/065321 A1
Patent Literature 3: WO 2016/093212 A1

SUMMARY OF INVENTION

Technical Problem

The present invention relates to a glass fiber having a low spinning temperature and a low liquidus temperature, and besides, having a large difference between the liquidus temperature and the spinning temperature, and a method of manufacturing the same.

Solution to Problem

The inventors of the present invention have made extensive investigations on a devitrified crystal of a glass fiber suitable for reinforcing GRC. As a result, the inventors have ascertained that an initial phase of the devitrified crystal is formed of a crystal in which MgO, CaO, $Na_2O$, $K_2O$, and the like are solid solved in zircon ($ZrSiO_4$), and have found that the initial phase is more liable to be deposited in glass comprising MgO and CaO in a larger amount than in other glasses.

Moreover, the inventors of the present invention have made further investigations and found that the above-mentioned phenomenon is related to the magnitude of electric field strength. That is, it is considered that a Mg ion and a Ca ion at high electric field strength are each liable to be energetically stable as a solid solution crystal. Further, the Mg ion and the Ca ion each have an ionic radius close to a Zr ion in zircon ($ZrSiO_4$), and hence are each liable to be more stable as a solid solution crystal. As a result, it is considered that, when solid solved in zircon ($ZrSiO_4$), the Mg ion and the Ca ion are particularly liable to cause deposition of the initial phase and thus cause devitrification, as compared to a Na ion and a K ion.

Based on the above-mentioned findings, the inventors of the present invention have found that a glass fiber having a low spinning temperature and a low liquidus temperature, and further, having a large difference between the spinning temperature and the liquidus temperature can be produced by strictly specifying glass composition ranges of the glass fiber. Thus, the finding is proposed as the present invention.

That is, according to one embodiment of the present invention, there is provided a glass fiber, comprising as a glass composition, in terms of mass % on an oxide basis, 50% to 65% of $SiO_2$, 0% to 3% of $Al_2O_3$, 0% to 1% of MgO, 0% to less than 0.7% of CaO, 0% to 1% of $Li_2O$, 10% to 20% of $Na_2O$, 0% to 2% of $K_2O$, 6% to 10% of $TiO_2$, and 15% to 20% of $ZrO_2$, and having a value for $(Na_2O+K_2O)/(MgO+CaO)$ of 6.0 or more. The "value for $(Na_2O+K_2O)/(MgO+CaO)$" refers to a value obtained by dividing a total of the content of $Na_2O$ and the content of $K_2O$ by a total of the content of MgO and the content of CaO.

With this, the glass fiber having a low spinning temperature and a low liquidus temperature, and further, having a large difference between the spinning temperature and the liquidus temperature can be obtained.

In addition, it is preferred that the glass fiber according to the one embodiment of the present invention be regulated to comprise, as a glass composition, in terms of mass % on an oxide basis, 0% to 0.1% of MgO and 0% to 0.6% of $Li_2O$.

With this, the liquidus temperature can be further reduced.

In addition, it is preferred that the glass fiber according to the one embodiment of the present invention have a spinning temperature of 1,280° C. or less.

With this, a production cost can be reduced.

In addition, it is preferred that the glass fiber according to the one embodiment of the present invention have a difference between a spinning temperature and a liquidus temperature of 120° C. or more.

With this, glass is less liable to be devitrified, and hence it becomes easy to continuously produce the glass fiber.

In addition, it is preferred that the glass fiber according to the one embodiment of the present invention have a liquidus temperature of 1,120° C. or less.

With this, the difference between the spinning temperature and the liquidus temperature can be easily increased.

In addition, it is preferred that, when glass of a specific gravity fraction obtained by pulverizing and classifying the glass fiber according to the one embodiment of the present invention into a particle size of from 300 μm to 500 μm is immersed in 100 ml of a 10 mass % NaOH aqueous solution under conditions of 80° C. and 90 hours, the glass have a mass reduction rate of 4% or less.

In addition, it is preferred that, when glass of a specific gravity fraction obtained by pulverizing and classifying the glass fiber according to the one embodiment of the present invention into a particle size of from 300 μm to 500 μm is immersed in 100 ml of a 10 mass % HCl aqueous solution under conditions of 80° C. and 90 hours, the glass have a mass reduction rate of 4% or less.

In addition, it is preferred that the glass fiber according to the one embodiment of the present invention have an alkali elution amount according to JIS R3502 (1995) of 0.35 mg or less.

According to another embodiment of the present invention, there is provided a method of manufacturing a glass fiber, comprising: melting, in a glass melting furnace, a raw material batch blended so as to comprise as a glass composition, in terms of mass % on an oxide basis, 50% to 65% of $SiO_2$, 0% to 3% of $Al_2O_3$, 0% to 1% of MgO, 0% to less than 0.7% of CaO, 0% to 1% of $Li_2O$, 10% to 20% of $Na_2O$, 0% to 2% of $K_2O$, 6% to 10% of $TiO_2$, and 15% to 20% of $ZrO_2$, and have a value for $(Na_2O+K_2O)/(MgO+CaO)$ of 6.0 or more; and continuously drawing the resultant molten glass from a bushing to form the molten glass into a fiber form.

DESCRIPTION OF EMBODIMENTS

Now, a glass fiber of the present invention is described in detail.

First, the actions of constituent components of the glass fiber of the present invention and the reasons why the contents of the components are specified as described above are described. In the description of the ranges of the contents of the components, the expression "%" represents "mass %". In addition, in the present invention, the "spinning temperature" means a temperature at which glass has a viscosity of $10^3$ dPa·s, and the "liquidus temperature" means that a temperature at which an initial phase of a crystal serving as a factor for devitrification is deposited.

$SiO_2$ is a main component that forms a glass skeleton structure. In addition, $SiO_2$ is also a component that improves the acid resistance of glass. The content of $SiO_2$ is from 50% to 65%, preferably from 55% to 60%, more preferably from 57% to 60%. When the content of $SiO_2$ is too small, the mechanical strength of the glass is liable to be reduced. In addition, the acid resistance of the glass is reduced. Meanwhile, when the content of $SiO_2$ is too large, the viscosity of the glass is increased, and thus energy required for melting the glass is increased. In addition, a bushing made of a noble metal is severely damaged, and exchange frequency thereof is increased, which results in an increase in production cost. In addition, the alkali resistance of the glass is reduced.

$Al_2O_3$ is a component that improves the chemical durability and the mechanical strength of the glass. Meanwhile, $Al_2O_3$ is also a component that increases the viscosity of the glass. The content of $Al_2O_3$ is from 0% to 3%, preferably from 0% to 2%, more preferably from 0% to 1%, from 0% to 0.8%, from 0% to 0.7%, or from 0% to 0.6%, most preferably from 0% to 0.5%. When the content of $Al_2O_3$ is too large, the viscosity of the glass is increased, and thus energy required for melting the glass is increased. In addition, the liquidus temperature of the glass is increased, and thus a difference between the spinning temperature and the liquidus temperature is reduced, which results in a reduction in productivity.

MgO is a component that reduces the viscosity of the glass and increases the elastic modulus of the glass. The content of MgO is from 0% to 1%, preferably from 0% to 0.5%, more preferably from 0% to 0.1%, still more preferably from 0% to 0.05%, most preferably from 0% to 0.03%.

However, as described above, in the glass fiber suitable for reinforcing GRC, an initial phase is formed of a crystal in which MgO, CaO, $Na_2O$, $K_2O$, and the like are solid solved in zircon ($ZrSiO_4$). Moreover, of those solid solution components, a Mg ion, which has an ionic radius comparable to that of a Zr ion and is subjected to significantly high electric field strength, is more liable to be energetically stable as a solid solution crystal. As a result, zircon in which Mg is solid solved is liable to be deposited as the initial phase. Accordingly, when the content of MgO is too large, the liquidus temperature of the glass is increased, and thus a difference between the spinning temperature and the liquidus temperature is reduced, which results in a reduction in productivity. Therefore, the glass fiber of the present invention is preferably free of MgO on the design of a composition.

CaO is a component that reduces the viscosity of the glass and improves the water resistance of the glass. The content of CaO is from 0% to less than 0.7%, preferably from 0.1% to less than 0.7%, more preferably from 0.1% to 0.6% or from 0.2% to 0.6%, most preferably from 0.3% to 0.6%.

When the content of CaO is too small, it becomes difficult to obtain the above-mentioned effect. Therefore, the glass fiber of the present invention preferably comprises CaO to the extent that the productivity is not reduced while the water resistance is ensured on the design of a composition. Meanwhile, a Ca ion is also subjected to high electric field strength as with the Mg ion, and hence when the content of CaO is too large, zircon in which Ca is solid solved is liable to be deposited as the initial phase. As a result, the liquidus temperature of the glass is increased, and thus a difference between the spinning temperature and the liquidus temperature is reduced, which results in a reduction in productivity.

$Li_2O$ is a component that reduces the viscosity of the glass to improve the meltability and the formability of the glass. However, $Li_2O$ has a high raw material cost, and hence the glass fiber of the present invention is preferably free of $Li_2O$ on the design of a composition. Therefore, the content of $Li_2O$ is from 0% to 1%, preferably from 0% to 0.8%, from 0% to 0.6%, or from 0% to 0.5%, more preferably from 0% to 0.4%, most preferably from 0% to 0.3%.

$Na_2O$ is a component that reduces the viscosity of the glass to improve the meltability and the formability of the glass. The content of $Na_2O$ is from 10% to 20%, preferably from 10% to 18%, more preferably from 12% to 18%, from 12% to 17%, from 13% to 17%, or from 13% to 16%, most preferably from 14% to 16%. When the content of $Na_2O$ is too small, the viscosity of the glass is increased, and thus energy required for melting the glass is increased. In addition, a bushing made of a noble metal is severely damaged, and exchange frequency thereof is increased, which results in an increase in production cost. Meanwhile, when the content of $Na_2O$ is too large, the initial phase in which MgO, CaO, $Na_2O$, $K_2O$, and the like are solid solved in zircon ($ZrSiO_4$) is liable to be deposited. As a result, the liquidus temperature of the glass is increased, and thus a difference between the spinning temperature and the liquidus temperature is reduced, which results in a reduction in productivity. In addition, the water resistance of the glass is reduced.

$K_2O$ is a component that reduces the viscosity of the glass to improve the meltability and the formability of the glass. The content of $K_2O$ is from 0% to 2%, preferably from 0% to 1.5%, more preferably from 0% to 1%, still more preferably from 0% to 0.8%, most preferably from 0% to 0.5%. When the content of $K_2O$ is too small, the viscosity of the glass is increased, and thus energy required for melting the glass is increased. Meanwhile, when the content of $K_2O$ is too large, the water resistance of the glass is reduced. In addition, a raw material batch is liable to absorb a water content, and an agglomerate of raw material powder (a so-called "lump") is liable to be formed. The case in which the agglomerate of raw material powder is formed is not preferred because the solubility of the raw material batch is reduced, and undissolved zirconia is liable to remain in a product glass.

MgO, CaO, $Na_2O$, and $K_2O$ are each a component that reduces the viscosity of the glass to improve the meltability and the formability of the glass. In addition, those components each have a low raw material cost as compared to $Li_2O$ and are thus suitable for suppressing a manufacturing cost. Therefore, from the viewpoint of the manufacturing cost, MgO, CaO, $Na_2O$, and $K_2O$ are each preferably incorporated in a larger amount than $Li_2O$. Meanwhile, as described above, the initial phase of a devitrified crystal is formed of a crystal in which MgO, CaO, $Na_2O$, $K_2O$, and the like are solid solved in zircon ($ZrSiO_4$). Therefore, when the total content of MgO+CaO+$Na_2O$+$K_2O$ is too large, the initial phase is liable to be deposited, and there is a risk in that the liquidus temperature is increased. Therefore, the total content of MgO+CaO+$Na_2O$+$K_2O$ is preferably from 10% to 23.5%, from 11% to 20%, from 12% to 18%, or from 13% to 17%.

The glass fiber of the present invention can maintain high productivity while reducing a raw material cost by strictly controlling a mass ratio of ($Na_2O$+$K_2O$)/(MgO+CaO) to 6.0 or more. When the ratio is too small, that is, when the content of $Na_2O$+$K_2O$ is too small with respect to the content of MgO+CaO, the liquidus temperature of the glass is increased, and thus a difference between the spinning temperature and the liquidus temperature is reduced, which results in a reduction in productivity. Therefore, the mass ratio of ($Na_2O$+$K_2O$)/(MgO+CaO) is 6.0 or more, preferably 10 or more, 15 or more, 18 or more, 20 or more, 21 or more, 22 or more, 23 or more, 23.6 or more, 24 or more, or 25 or more, particularly preferably 26 or more. Meanwhile, when the mass ratio of ($Na_2O$+$K_2O$)/(MgO+CaO) is too large, there is a risk in that the water resistance of the glass is reduced. Therefore, the mass ratio of ($Na_2O$+$K_2O$)/(MgO+CaO) is preferably 3,000 or less, more preferably 2,000 or less, 1,500 or less, 1,000 or less, 500 or less, 300 or less, 100 or less, 80 or less, or 60 or less.

In addition, the contents of MgO, CaO, $Na_2O$, and $K_2O$ are preferably such that the expression MgO<CaO<$Na_2O$ and/or the expression MgO<CaO<$K_2O$ is satisfied. With this, the liquidus temperature of the glass is reduced, and thus a difference between the spinning temperature and the liquidus temperature can be increased.

In addition, the content of MgO+CaO is preferably 1.5% or less, 1.2% or less, 1.0% or less, or 0.7% or less, more preferably 0.6% or less, still more preferably 0.5% or less. With this, the liquidus temperature of the glass is reduced, and thus a difference between the spinning temperature and the liquidus temperature can be increased.

$TiO_2$ is a component that improves the water resistance and the alkali resistance of the glass. $TiO_2$ is also a component that reduces the spinning temperature and significantly reduces the liquidus temperature. The content of $TiO_2$ is from 6% to 10%, preferably from 6% to 9%, more preferably from 6% to 8.5%, most preferably from 6% to 8%. When the content of $TiO_2$ is too small, the water resistance and the alkali resistance of the glass are reduced. In addition, the spinning temperature is increased, and thus the production cost is increased. Meanwhile, when the content of $TiO_2$ is too large, a crystal comprising $TiO_2$ is liable to be deposited in the glass, and the liquidus temperature is significantly increased. As a result, a difference between the spinning temperature and the liquidus temperature is reduced, which results in a reduction in productivity.

$ZrO_2$ is a component that improves the alkali resistance, the acid resistance, and the water resistance of the glass. The content of $ZrO_2$ is from 15% to 20%, preferably from 17% to 20%, from 17.2% to 19.5%, from 17.2% to 19.0%, from 17.2% to 18.5%, or from 17.5% to 18.5%, most preferably from 17.5% to 18.0%. When the content of $ZrO_2$ is too small, the alkali resistance is reduced, and durability required for GRC cannot be achieved. Meanwhile, when the content of $ZrO_2$ is too large, the liquidus temperature of the glass is increased, and thus a difference between the spinning temperature and the liquidus temperature is reduced, which results in a reduction in productivity.

In addition, the glass fiber of the present invention may comprise components other than the above-mentioned components ($SiO_2$, $Al_2O_3$, MgO, CaO, $Li_2O$, $Na_2O$, $K_2O$, $TiO_2$, and $ZrO_2$). However, it is desired that the composition be adjusted so that the contents of the above-mentioned components in terms of a total content are 98% or more, particularly 99% or more. The reason for this is as described below. When the total content of the above-mentioned components is less than 98%, there is liable to occur inconvenience such that the alkali resistance, the acid resistance, and the water resistance are reduced owing to unintended mixing of a foreign component, which results in reductions in characteristics as a product, or such that a difference between the spinning temperature and the liquidus temperature is reduced, which results in a reduction in productivity.

As the components other than the above-mentioned components, for example, trace components, such as $H_2$, $CO_2$, CO, $H_2O$, He, Ne, Ar, and $N_2$, may each be incorporated up to 0.1%. In addition, a noble metal element, such as Pt, Rh, or Au, may be added up to 500 ppm to the glass.

Further, in order to improve the alkali resistance, the acid resistance, the water resistance, and the liquidus temperature, $B_2O_3$, SrO, BaO, ZnO, $Fe_2O_3$, $P_2O_5$, $Cr_2O_3$, $Sb_2O_3$, $SO_3$, MnO, $SnO_2$, $CeO_2$, $Cl_2$, $La_2O_3$, $WO_3$, $Nb_2O_5$, $Y_2O_3$, and the like may be incorporated up to 2% in terms of a total content. From the viewpoint of an environmental load, it is preferred that $B_2O_3$ be not incorporated in a large amount on the design of a composition. The content of $B_2O_3$ is preferably less than 1%, less than 0.5%, less than 0.3%, or less than 0.1%.

Next, the characteristics of the glass fiber of the present invention are described.

When glass of a specific gravity fraction obtained by pulverizing and classifying the glass fiber of the present invention into a particle size of from 300 μm to 500 μm is immersed in 100 ml of a 10 mass % NaOH aqueous solution under the conditions of 80° C. and 90 hours, the glass has a mass reduction rate of preferably 4% or less, more preferably 3.8% or less, 3.5% or less, 3.3% or less, or 3.1% or less, most preferably 3% or less. When the glass has a high mass reduction rate in this alkali resistance test, the alkali resistance of the glass is reduced, and thus reliability as a reinforcing material for a composite material, such as a calcium silicate board or GRC, is reduced.

When glass of a specific gravity fraction obtained by pulverizing and classifying the glass fiber of the present invention into a particle size of from 300 μm to 500 μm is immersed in 100 ml of a 10 mass % HCl aqueous solution under the conditions of 80° C. and 90 hours, the glass has a mass reduction rate of preferably 4% or less, more preferably 3.8% or less, 3.5% or less, 3.3% or less, 3.1% or less, 2.9% or less, 2.7% or less, or 2.5% or less, most preferably 2% or less. When the glass has a high mass reduction rate in this acid resistance test, the acid resistance of the glass is reduced, and thus reliability as a corrosion resistant material, such as a battery separator, is reduced.

The glass fiber of the present invention has an alkali elution amount measured by, as a water resistance test, a method in conformity with JIS R3502 (1995) of preferably 0.35 mg or less, more preferably 0.32 mg or less, most preferably 0.30 mg or less. When the glass fiber has a large alkali elution amount, an alkali component is eluted from the glass during autoclave treatment, and the glass is liable to deteriorate.

The glass fiber of the present invention has a spinning temperature of preferably 1,280° C. or less, more preferably 1,278° C. or less, 1,276° C. or less, 1,274° C. or less, 1,272° C. or less, or 1,270° C. or less, particularly preferably 1,270° C. or less. When the glass fiber has a high spinning temperature, a bushing made of a noble metal is severely damaged because spinning is required to be performed at high temperature, and exchange frequency thereof is increased, which results in an increase in production cost.

The glass fiber of the present invention has a difference between the spinning temperature and the liquidus temperature of preferably 120° C. or more, 125° C. or more, 128° C. or more, 130° C. or more, 132° C. or more, 134° C. or more, 136° C. or more, 138° C. or more, 140° C. or more, 141° C. or more, 142° C. or more, 143° C. or more, 144° C. or more, or 145° C. or more, most preferably 146° C. or more. When the glass fiber has a small difference between the spinning temperature and the liquidus temperature, the productivity is reduced.

The glass fiber of the present invention has a liquidus temperature of preferably 1,120° C. or less, 1,119° C. or less, 1,118° C. or less, 1,117° C. or less, 1,116° C. or less, 1,115° C. or less, 1,114° C. or less, 1,113° C. or less, 1,112° C. or less, 1,111° C. or less, or 1,110° C. or less, most preferably 1,109° C. or less. When the glass fiber has a high liquidus temperature, the productivity is reduced.

Next, a method of manufacturing a glass fiber of the present invention is described by taking a direct melt method (DM method) as an example. However, the present invention is not limited to the following method, and for example, a so-called indirect forming method (marble melt method: MM method), in which a glass material for fibers formed into a marble form is re-melted and spun with a bushing device, may also be adopted. This method is suitable for producing a wide variety of products in small quantities.

First, a raw material batch is blended so as to comprise as a glass composition, in terms of mass % on an oxide basis, 50% to 65% of $SiO_2$, 0% to 3% of $Al_2O_3$, 0% to 1% of MgO, 0% to less than 0.7% of CaO, 0% to 1% of $Li_2O$, 10% to 20% of $Na_2O$, 0% to 2% of $K_2O$, 6% to 10% of $TiO_2$, and 15% to 20% of $ZrO_2$, and have a value for ($Na_2O+K_2O$)/(MgO+CaO) of 6.0 or more. Glass cullet may be used as part or the whole of glass raw materials. The reasons why the contents of the components are specified as described above have already been described, and the description thereof is omitted.

Next, the blended raw material batch is loaded into a glass melting furnace to be vitrified, melted, and homogenized. A suitable melting temperature is from about 1,400° C. to about 1,600° C.

Subsequently, the resultant molten glass is formed into a glass fiber.

As part of an embodiment, the molten glass is supplied to a bushing, and the molten glass supplied to the bushing is continuously drawn in a filament form from a plurality of bushing nozzles arranged at a bottom of the bushing. A monofilament thus drawn has applied thereon various treatment agents, and a predetermined number of the monofilaments are bundled to obtain a glass strand. The glass fiber of the present invention encompasses not only the above-mentioned glass strand, but also a staple fiber, such as glass wool formed by a centrifugation method, and the monofilament before being bundled into the glass strand.

The glass fiber of the present invention thus formed is processed into, for example, a chopped strand, a yarn, or a roving, and is used for various applications. The "chopped strand" refers to a product obtained by cutting a glass fiber (strand) obtained by bundling glass monofilaments into a predetermined length. The "yarn" refers to a product obtained by twisting the strand. The "roving" refers to a product obtained by doubling a plurality of strands and winding the strands in a cylindrical shape.

EXAMPLES

Example 1

Now, the present invention is specifically described by way of Examples. Examples (Sample Nos. 1 to 8 and 17 to 22) of glass for forming the glass fibers of the present invention are shown in Table 1 and Table 3. Comparative Examples (Sample Nos. 9 to 16) are shown in Table 2.

TABLE 1

|  |  | No. 1 | No. 2 | No. 3 | No. 4 | No. 5 | No. 6 | No. 7 | No. 8 |
|---|---|---|---|---|---|---|---|---|---|
| $SiO_2$ | mass % | 58.6 | 58.5 | 58.4 | 58.4 | 58.3 | 58.6 | 58.6 | 58.9 |
| $Al_2O_3$ |  | 0.1 | 0.2 | 0.2 | 0.2 | 0.2 | 0.2 | 0.2 | 0.1 |
| MgO |  | 0.01 | 0.01 | 0.01 | 0.01 | 0.01 | 0.01 | 0.01 | 0.01 |
| CaO |  | 0.6 | 0.6 | 0.6 | 0.6 | 0.6 | 0.6 | 0.5 | 0.5 |
| $Li_2O$ |  | 0.3 | 0.3 | 0.2 | 0.2 | 0.2 | 0.1 | 0.1 | — |
| $Na_2O$ |  | 14.6 | 14.8 | 14.9 | 14.9 | 15.1 | 15.0 | 15.0 | 15.2 |
| $K_2O$ |  | 1.2 | 1.0 | 0.8 | 0.7 | 0.6 | 0.4 | 0.4 | — |
| $TiO_2$ |  | 7.0 | 7.1 | 7.3 | 7.4 | 7.5 | 7.6 | 7.6 | 7.8 |
| $ZrO_2$ |  | 17.6 | 17.5 | 17.6 | 17.6 | 17.5 | 17.5 | 17.6 | 17.5 |
| $(Na_2O + K_2O)/(MgO + CaO)$ | — | 26.3 | 25.9 | 25.7 | 25.6 | 25.7 | 25.2 | 30.2 | 29.8 |
| Spinning temperature | ° C. | 1,254 | 1,253 | 1,255 | 1,258 | 1,258 | 1,261 | 1,262 | 1,271 |
| Liquidus temperature |  | 1,113 | 1,113 | 1,114 | 1,113 | 1,107 | 1,102 | 1,108 | 1,110 |
| Spinning temperature-liquidus temperature |  | 141 | 141 | 142 | 145 | 151 | 159 | 154 | 161 |
| Acid resistance | % | — | 0.7 | — | — | — | — | — | 0.7 |
| Alkali resistance |  | — | 2.9 | — | — | — | — | — | 2.9 |
| Water resistance (alkali elution amount) | mg | — | 0.28 | — | — | — | — | — | 0.26 |

TABLE 2

|  |  | No. 9 | No. 10 | No. 11 | No. 12 | No. 13 | No. 14 | No. 15 | No. 16 |
|---|---|---|---|---|---|---|---|---|---|
| $SiO_2$ | mass % | 57.2 | 54.9 | 57.2 | 56.8 | 57.2 | 65.1 | 58.2 | 59.3 |
| $Al_2O_3$ |  | 0.2 | 0.1 | 0.2 | 0.2 | 0.2 | 0.2 | 0.3 | 0.4 |
| MgO |  | 0.5 | 4.0 | 0.02 | 0.01 | 0.02 | 0.01 | 0.02 | 0.02 |
| CaO |  | 1.0 | 0.5 | 0.7 | 0.7 | 1.0 | 1.1 | 2.2 | 3.4 |
| $Li_2O$ |  | — | — | — | 0.4 | — | — | — | — |
| $Na_2O$ |  | 15.5 | 15.1 | 15.5 | 15.5 | 15.5 | 15.5 | 15.2 | 14.8 |
| $K_2O$ |  | 0.3 | — | 1.4 | 1.1 | 0.8 | 0.6 | 0.7 | 0.5 |
| $TiO_2$ |  | 7.8 | 7.8 | 7.5 | 7.8 | 7.8 | — | 5.9 | 4.0 |
| $ZrO_2$ |  | 17.5 | 17.6 | 17.5 | 17.5 | 17.5 | 17.5 | 17.5 | 17.6 |
| $(Na_2O + K_2O)/(MgO + CaO)$ | — | 10.5 | 3.4 | 23.5 | 23.4 | 16 | 14.5 | 7.2 | 4.5 |
| Spinning temperature | ° C. | 1,240 | 1,251 | 1,251 | 1,251 | 1,248 | 1,250 | 1,251 | 1,262 |
| Liquidus temperature |  | 1,184 | 1,304 | 1,140 | 1,140 | 1,135 | 1,132 | 1,166 | 1,174 |
| Spinning temperature-liquidus temperature |  | 56 | −53 | 111 | 111 | 113 | 118 | 85 | 88 |
| Acid resistance | % | — | — | 0.6 | — | — | — | — | — |
| Alkali resistance |  | — | — | 2.9 | — | — | — | — | — |
| Water resistance (alkali elution amount) | mg | — | — | 0.29 | — | — | — | — | — |

TABLE 3

|  |  | No. 17 | No. 18 | No. 19 | No. 20 | No. 21 | No. 22 |
|---|---|---|---|---|---|---|---|
| $SiO_2$ | mass % | 58.8 | 58.5 | 57.1 | 58.5 | 57.6 | 55.8 |
| $Al_2O_3$ |  | — | 0.2 | 0.2 | 0.2 | 0.2 | 0.1 |
| MgO |  | 0.01 | — | 0.01 | 0.01 | 0.01 | 0.01 |
| CaO |  | 0.6 | 0.6 | — | 0.6 | 0.4 | 0.3 |
| $Li_2O$ |  | 0.3 | 0.3 | 0.2 | 0.2 | 0.5 | 0.4 |
| $Na_2O$ |  | 14.3 | 14.8 | 14.9 | 15.1 | 14.0 | 14.3 |

TABLE 3-continued

|  |  | No. 17 | No. 18 | No. 19 | No. 20 | No. 21 | No. 22 |
|---|---|---|---|---|---|---|---|
| $K_2O$ |  | 1.2 | 1.0 | 0.8 | 0.6 | 0.8 | 1.5 |
| $TiO_2$ |  | 7.0 | 7.1 | 9.0 | 7.6 | 8.3 | 8.6 |
| $ZrO_2$ |  | 17.8 | 17.5 | 17.8 | 17.2 | 18.2 | 19.0 |
| $(Na_2O + K_2O)/(MgO + CaO)$ | — | 25.4 | 26.3 | 1,570 | 25.7 | 36.1 | 51 |
| Spinning temperature | ° C. | 1,260 | 1,255 | 1,264 | 1,254 | 1,260 | 1,266 |
| Liquidus temperature |  | 1,119 | 1,110 | 1,113 | 1,108 | 1,119 | 1,120 |
| Spinning temperature-liquidus temperature |  | 141 | 145 | 151 | 146 | 141 | 146 |
| Acid resistance | % | — | 0.7 | — | — | — | — |
| Alkali resistance |  | — | 2.9 | — | — | — | — |
| Water resistance (alkali elution amount) | mg | — | 0.28 | — | — | — | — |

Each of the samples shown in the tables was prepared as described below.

First, various glass raw materials, such as a natural raw material and a chemical raw material, were weighed and mixed so as to give the glass composition shown in the table to produce a raw material batch. Next, the raw material batch was loaded into a crucible made of a platinum-rhodium alloy, and was then heated at 1,550° C. for 5 hours in an indirect heating electric furnace to obtain molten glass. In order to obtain homogeneous molten glass, the molten glass was stirred a plurality of times with a heat-resistant stirring rod. Subsequently, the obtained molten glass was poured out into a refractory mold to be formed into a sheet-shaped glass, and was then subjected to annealing treatment in an annealing furnace (the glass was heated at a temperature higher than the temperature at which the glass had a viscosity of $10^{13}$ dPa·s by from 30° C. to 50° C. for 30 minutes, and was then reduced in temperature at a rate of 1° C./min in a temperature region of from an annealing point to a strain point). Each of the obtained samples was measured for alkali resistance, acid resistance, an alkali elution amount, a spinning temperature, and a liquidus temperature.

The spinning temperature was measured as described below. First, the above-mentioned sheet-shaped glass sample was crushed into appropriate dimensions, and was loaded into a crucible made of alumina so as to prevent inclusion of bubbles to the extent possible. Subsequently, the crucible made of alumina was heated to bring the glass sample into the state of a melt, and the viscosity of the glass was measured at a plurality of temperatures by a platinum sphere pull up method. After that, a viscosity curve was created based on the obtained plurality of measured values, and the temperature at which the glass had a viscosity of $10^3$ dPa·s was calculated by interpolation.

The liquidus temperature was measured as described below. First, the above-mentioned sheet-shaped glass sample was pulverized and adjusted to a particle size falling within the range of from 300 μm to 500 μm, and was filled in a refractory container under the state of having an appropriate bulk density. Subsequently, the refractory container was loaded into a temperature gradient furnace of an indirect heating type set to a maximum temperature of 1,350° C. and left to stand still, and a heating operation was performed in the air atmosphere for 16 hours. After that, a test body was taken out of the temperature gradient furnace together with the refractory container and cooled to room temperature. After that, the liquidus temperature was specified with a polarizing microscope.

The difference between the spinning temperature and the liquidus temperature was calculated from both the values.

The acid resistance was measured as described below. First, the above-mentioned sheet-shaped glass sample was pulverized, and only glass of a specific gravity fraction having a particle size in terms of a diameter of from 300 μm to 500 μm was precisely weighed, and the glass was subsequently immersed in 100 ml of a 10 mass % HCl solution and shaken under the conditions of 80° C. and 90 hours. After that, the mass reduction rate of the glass sample was measured. A smaller value for the mass reduction rate indicates more excellent acid resistance.

The alkali resistance was measured as described below. First, the above-mentioned sheet-shaped glass sample was pulverized, and only glass of a specific gravity fraction having a particle size in terms of a diameter of from 300 μm to 500 μm was precisely weighed, and the glass was subsequently immersed in 100 ml of a 10 mass % NaOH solution and shaken under the conditions of 80° C. and 90 hours. After that, the mass reduction rate of the glass sample was measured. A smaller value for the mass reduction rate indicates more excellent alkali resistance.

The alkali elution amount indicating the water resistance was measured by a method in conformity with JIS R3502 (1995). A smaller value for the alkali elution amount indicates more excellent water resistance.

As apparent from Table 1 and Table 3, in each of Sample Nos. 1 to 8 and 17 to 22 serving as Examples, the spinning temperature and the liquidus temperature of the glass were 1,271° C. or less and 1,120° C. or less, respectively, and the difference between the spinning temperature and the liquidus temperature of the glass was 141° C. or more. Thus, each of Sample Nos. 1 to 8 and 17 to 22 was excellent in productivity. Further, the mass reduction rates serving as indicators of the acid resistance and the alkali resistance were each 4% or less, and the alkali elution amount serving as an indicator of the water resistance was 0.35 mg or less.

In contrast, in each of Sample Nos. 9 to 16 serving as Comparative Examples, the liquidus temperature was high, and the difference between the spinning temperature and the liquidus temperature was small. Specifically, the liquidus temperature was 1,132° C. or more, and the difference between the spinning temperature and the liquidus temperature of the glass was less than 120° C. Thus, stable continuous production becomes difficult.

Example 2

Next, raw material batches blended so as to give the glass compositions of Sample Nos. 1 to 8 and 17 to 22 shown in Table 1 and Table 3 were each loaded into a glass melting furnace, melted at a temperature of from 1,400° C. to 1,600°

C., and homogenized. Subsequently, the obtained molten glass was supplied to a bushing, and was continuously drawn in a filament form from bushing nozzles arranged at a bottom of the bushing. A treatment agent was applied to a monofilament thus obtained, and 2,000 to 4,000 of the monofilaments were bundled to obtain a glass strand.

INDUSTRIAL APPLICABILITY

The glass fiber of the present invention is suitable as a reinforcing material for GRC, and as well, as a reinforcing material for a calcium silicate board and as a corrosion resistant material, such as a battery separator.

The invention claimed is:

1. A glass fiber, comprising as a glass composition, in terms of mass % on an oxide basis, 50% to 65% of $SiO_2$, 0% to 3% of $Al_2O_3$, 0% to 1% of MgO, 0% to less than 0.7% of CaO, 0% to 1% of $Li_2O$, 10% to 20% of $Na_2O$, 0% to 2% of $K_2O$, 6% to 10% of $TiO_2$, and 15% to 20% of $ZrO_2$, and having a value for $(Na_2O+K_2O)/(MgO+CaO)$ from 25 to 30.2.

2. The glass fiber according to claim 1, wherein the glass fiber has a liquidus temperature of 1,120° C. or less.

3. The glass fiber according to claim 1, wherein, when glass of a specific gravity fraction obtained by pulverizing and classifying the glass fiber into a particle size of from 300 μm to 500 μm is immersed in 100 ml of a 10 mass % NaOH aqueous solution under conditions of 80° C. and 90 hours, the glass has a mass reduction rate of 4% or less.

4. The glass fiber according to claim 1, wherein, when glass of a specific gravity fraction obtained by pulverizing and classifying the glass fiber into a particle size of from 300 μm to 500 μm is immersed in 100 ml of a 10 mass % HCl aqueous solution under conditions of 80° C. and 90 hours, the glass has a mass reduction rate of 4% or less.

5. The glass fiber according to claim 1, wherein the glass fiber has an alkali elution amount according to JIS R3502 (1995) of 0.35 mg or less.

6. The glass fiber according to claim 1, wherein the glass fiber has a difference between a spinning temperature and a liquidus temperature of 120° C. or more.

7. The glass fiber according to claim 6, wherein the glass fiber has a liquidus temperature of 1,120° C. or less.

8. The glass fiber according to claim 1, wherein the glass fiber has a spinning temperature of 1,280° C. or less.

9. The glass fiber according to claim 8, wherein the glass fiber has a liquidus temperature of 1,120° C. or less.

10. The glass fiber according to claim 8, wherein the glass fiber has a difference between a spinning temperature and a liquidus temperature of 120° C. or more.

11. The glass fiber according to claim 10, wherein the glass fiber has a liquidus temperature of 1,120° C. or less.

12. The glass fiber according to claim 1, wherein the glass fiber comprises as a glass composition, in terms of mass % on an oxide basis, 0% to 0.1% of MgO and 0% to 0.6% of $Li_2O$.

13. The glass fiber according to claim 12, wherein the glass fiber has a liquidus temperature of 1,120° C. or less.

14. The glass fiber according to claim 12, wherein the glass fiber has a difference between a spinning temperature and a liquidus temperature of 120° C. or more.

15. The glass fiber according to claim 14, wherein the glass fiber has a liquidus temperature of 1,120° C. or less.

16. The glass fiber according to claim 12, wherein the glass fiber has a spinning temperature of 1,280° C. or less.

17. The glass fiber according to claim 16, wherein the glass fiber has a liquidus temperature of 1,120° C. or less.

18. The glass fiber according to claim 16, wherein the glass fiber has a difference between a spinning temperature and a liquidus temperature of 120° C. or more.

19. The glass fiber according to claim 18, wherein the glass fiber has a liquidus temperature of 1,120° C. or less.

20. A method of manufacturing a glass fiber, the method comprising: melting, in a glass melting furnace, a raw material batch blended so as to comprise as a glass composition, in terms of mass % on an oxide basis, 50% to 65% of $SiO_2$, 0% to 3% of $Al_2O_3$, 0% to 1% of MgO, 0% to less than 0.7% of CaO, 0% to 1% of $Li_2O$, 10% to 20% of $Na_2O$, 0% to 2% of $K_2O$, 6% to 10% of $TiO_2$, and 15% to 20% of $ZrO_2$, and have a value for $(Na_2O+K_2O)/(MgO+CaO)$ from 25 to 30.2; and continuously drawing the resultant molten glass from a bushing to form the molten glass into a fiber form.

* * * * *